(12) United States Patent
Rasmussen

(10) Patent No.: US 6,857,162 B1
(45) Date of Patent: Feb. 22, 2005

(54) CLEANING AND/OR TREATMENT DEVICE

(75) Inventor: Erik Rasmussen, Gentofte (DK)

(73) Assignee: Nilfisk Advance A/S, Brondby (DK)

( * ) Notice: Subject to any disclaimer, the term of this patent is extended or adjusted under 35 U.S.C. 154(b) by 0 days.

(21) Appl. No.: 09/807,175

(22) PCT Filed: Oct. 12, 1999

(86) PCT No.: PCT/DK99/00543

§ 371 (c)(1),
(2), (4) Date: Oct. 1, 2001

(87) PCT Pub. No.: WO00/21429

PCT Pub. Date: Apr. 20, 2000

Related U.S. Application Data

(60) Provisional application No. 60/103,953, filed on Oct. 13, 1998.

(30) Foreign Application Priority Data

Oct. 12, 1998 (DK) ........................... 1998 01292

(51) Int. Cl.[7] .................. A47L 11/30; B01D 63/08; B01D 63/10
(52) U.S. Cl. .............. 15/320; 210/167; 210/195.2; 210/241; 210/257.2; 210/258; 210/321.69; 210/411; 210/416.1; 210/650; 210/653; 210/654
(58) Field of Search ............... 15/320, 321; 210/167, 210/195.2, 241, 257.2, 258, 321.6–321.9, 411, 416.1, 650, 653, 654

(56) References Cited

U.S. PATENT DOCUMENTS

| | | | |
|---|---|---|---|
| 3,753,777 A | | 8/1973 | Thomsen et al. |
| 3,996,640 A | | 12/1976 | Blue et al. |
| 4,377,017 A | * | 3/1983 | Herpers et al. ............... 15/320 |
| 4,464,810 A | | 8/1984 | Karpanty |
| 4,741,069 A | | 5/1988 | Helm et al. |
| 5,331,713 A | * | 7/1994 | Tipton ......................... 15/320 |
| 5,535,476 A | | 7/1996 | Kresse et al. |
| 5,718,015 A | * | 2/1998 | Rohrbacher .................. 15/321 |
| 5,839,155 A | * | 11/1998 | Berglund et al. ............. 15/321 |
| 6,007,712 A | * | 12/1999 | Tanaka et al. ............... 210/151 |
| 6,076,229 A | * | 6/2000 | Berglund ..................... 15/321 |
| 6,302,967 B1 | * | 10/2001 | Rohrbacher et al. .......... 134/10 |

FOREIGN PATENT DOCUMENTS

| | | | |
|---|---|---|---|
| DE | 3115038 A1 | | 11/1982 |
| JP | 9-479 | * | 1/1997 |
| WO | WO 95/00061 | * | 1/1995 |

* cited by examiner

Primary Examiner—Terrence R. Till
(74) Attorney, Agent, or Firm—Alan D. Kamrath; Nikolai & Mersereau, P.A.

(57) ABSTRACT

The present invention relates to a cleaning and/or treatment device for cleaning and/or treating surfaces such as floors, pavements and carpets. The invention particularly relates to a cleaning and/or treatment device using cleaning/treatment solution, wherein the solution is recirculated and thereby used more than one time. The cleaning device comprises a filter unit for cleaning dirt from a dirty solution tank and means for recirculating said cleaned solution to a clean solution tank, wherein said filter unit comprise at least one cross-flow filter, said cross-flow filter preferably being a membrane filter. The invention also relates to a process of cleaning and/or treating surfaces using such a device.

38 Claims, 5 Drawing Sheets

Diagram of solution recycling system.

Figure 1: Diagram of solution recycling system.

CLEANING AND/OR TREATMENT DEVICE

CROSS REFERENCE

The present application is a national phase of International Appln. No. PCT/DK99/00543 filed Oct. 12, 1999, which claims the benefit of U.S. Provisional Appln. No. 60/103,953 filed Oct. 13, 1998.

BACKGROUND

The present invention relates to a cleaning and/or treatment device for cleaning and/or treating surfaces such as floors, pavements and carpets. The invention particularly relates to a cleaning and/or treatment device using cleaning/treatment solution, wherein the solution is recirculated and thereby used more than one time. The invention also relates to a process of cleaning and/or treating surfaces using such a device.

Cleaning devices such as floor scrubbers and carpet cleaners using detergent solutions comprising water and detergent (detergent solution is in the following referred to as solution) are well known in the art. Most of the known cleaning devices use the solution only once, and consequently use a lot of solution under operation. The general way of operating a floor scrubber or a carpet cleaning machine is firstly to prepare a solution. The solution is then placed in a clean solution tank of the machine, From the clean solution tank, the solution is fed to the surface (hard floor, carpet etc.) and spread onto said surface. The surface is cleaned using the dissolving power of the detergents, and may further be cleaned by mechanical means such as a brush. The mixture of dirt and solution is finally removed from the surface e.g. by using a squeegee and transported to a "dirty solution tank" of the machine. The dirty solution must then be disposed of (typically to the sewer). A new solution is prepared and filled into the machine, and the cleaning process may be continued.

As it appears from the above description, much operation time is required for emptying the dirty solution tank and refilling the cleaning device with fresh solution, Furthermore, cleaning devices using the solution only once, should either have a large supply tank or can only operate for a very short time. Another disadvantage of the above mentioned cleaning devices using solution only once is that a lot of solution comprising unused detergents is discarded into the environment which is both expensive and polluting to the environment. In order to avoid this problem, a number of cleaning devices having means for recirculating solution have been suggested.

A number of patent publications disclose different ways of recycling the solution in order to achieve more operational time and less discharge of dirty solution to the surrounding environment. The methods used are quite different from each other, and some of the methods have unwanted effects on the quality of cleaning, while still other methods require a lot of maintenance time.

U.S. Pat. No. 4,194,263 discloses a scrubber comprising a clean solution tank and a dirty solution tank A separator is placed between the clean solution tank and the dirty solution tank to separate the dirty solution into a sludge portion which is returned to the dirty solution tank, and a clean solution which is returned to the clean solution tank for being reused. The separator is a laminar flow tube settler.

A similar scrubber is known from U.S. Pat. No. 4,295,2443. In this scrubber, the separator has been replaced by a series (a box) of sedimentation chambers.

In GB 2,124,478A disclosing a similar scrubber, a separating system comprising a sedimentation chamber followed by centrifugation has been suggested.

EP 0 224 055 A2 discloses a similar cleaning device comprising a clean solution tank and a dirty solution tank. The two tanks are openly connected, and when passing from the dirty solution tank to the clean solution tank, solution has to pass a first filter with large mesh size and a fine filter for separating dirt from the solution.

In U.S. Pat. No. 5,535,476, a mobile cleaning apparatus with a clean solution tank and a dirty solution tank is disclosed. This apparatus includes a system of cleaning the dirty solution comprising a sieveplate in the dirty solution tank and a filter bag in the clean solution tank.

In U.S. Pat. No. 3,753,777, a method for cleaning surfaces is disclosed. In this method, a flocculant (polyelectrolytes) is added to the dirty solution in order to create "flocs of dirt" Thereafter, these flocs of dirt are removed using a sieve or a filter. Hereafter, the solution may be recycled. Adding polyelectrolytes (flocculants) to the solution will often cause less dissolving power of detergents present in the solution since these detergents often chemically bind to the flocculant, and thus cause either increased use of detergents or a less optimal cleaning result.

The main separation principals used for separating dirt and solution in the above described moving cleaning machines are sedimentation and filtration.

The "dirt" and debris present in the dirty solution are normally a mixture of particles having all shapes, regular or irregular, and typical densities varying from 0.1 to 10 g/cm³. For sedimentation to take place sedimentation time and physical conditions (rest) are important factors.

Sedimentation is not an effective separation technique for separating particles with specific gravities <1.00 g/m³.

For example, a 10 $\mu$m sphere (specific gravity 1.1 g/cm³) sinking in a slurry or "dirty water" solution (a low solids concentration water suspension with specific gravity of approximately 1.0 g/cm³) using Stokes law (anticipating laminar movement) results in a settling velocity $V_s$:

$$V_s = D^2 * g * (p_p - p_w) / 18 * \mu_w = 5.45 * 10^{-6} \text{ m/sek}$$

This means that such a sphere will require 1835 seconds to travel 1 cm. From this it can be concluded that the separator requires a residence time of the order of about 31 minutes. In the case where the dirty solution is a high solids concentration suspension, the residence time will increase further, due to the hindrance from the other solids in the solution. Addition of surface active materials, such as detergents, may further increase the sedimentation time. Solution consumption in floor scrubbers, for example, is of the order 1–10 l/min. Thus, the volume (size) of the separator unit becomes quite large and impractical for moving machines when small dirt particles (approximately 10 $\mu$m) must be removed. Practically, it is not possible to obtain a clear cleaned solution from a dirty solution by using sedimentation separation only. This will be shown later on in the section "Sedimentation of dirt".

Using filters as described in the above apparatus and methods have other disadvantages. The filters in all the devices described in the above mentioned patent publications are simple filters having a relatively open mesh. Such filters will not stop all visible particles. By applying several such filters in series each having still finer mesh size the solution may become relatively clear as described in U.S. Pat. No. 5,331,713 (White Cons. Ind.), but all traditional filters, as used in the known cleaning devices will clog. In the 4-filter-system described in U.S. Pat. No. 5,331,713, the dirt is captured in the filter system, mid no regeneration of the filters is described. Such "in-depth filter types" require fluent replacement, even when the particle or "dirt" load in the dirty solution is relatively low. Filtration of high "dirt" loaded solutions is practically impossible.

SUMMARY

The object of the present invention is to provide a cleaning and/or treatment device for cleaning and/or treating surfaces such as floors, pavements and carpets, which device comprises simple and effective regeneration equipment, and by use of which device, used cleaning/treatment solution can be regenerated as a clear cleaned solution.

Another object of the invention is to provide a cleaning and/or treatment device which can reuse the solution several times with as little loss of water and detergent/treatment chemicals as possible.

Yet another object of the invention is to provide a cleaning and/or treatment device which results in as little pollution to the environment as possible.

A further object of the invention is to provide a method of regeneration a dirty solution from such a cleaning and/or treatment device, which method is effective and simple.

These and other objects are obtained by the invention as defined in the claims.

In view of the prior art cleaning devices with recirculating solution, it is very surprising that it is possible to provide filter-systems that effectively separate dirt and particles from the dirty solution without clogging of the filter means, while the device is operating.

The present invention provides a new recycling technology for cleaning and/or treatment devices. By using the present invention as defined in the claims, collected dirty solution can be cleaned in the filter unit of the device, so that a clear solution determined by visual inspection, can be obtained, and this cleaned clear solution can be recycled back into the clean solution tank. Water and unused detergent and/or treatment chemicals may be recycled back to the clean solution tank and used again several times.

In the following the term "cleaning device" includes devices for cleaning and/or treating surfaces.

When the device is used for treating surfaces the clean solution contains one or more treatment chemicals, such as chemicals for improving the gloss of a floor or chemicals for providing a carpet with anti-static properties. In some situations, it is preferred that the cleaning solution may contain both treatment chemicals and detergents, provided that the chemicals and detergents do not interact in an undesired way.

The cleaning device of the present invention comprises a clean solution tank and a dirty solution tank. The size and shape of these tanks are not important The cleaning device further comprises a movable cleaner head, which cleaner head comprises at least one solution supply opening for supplying clean solution to a surface and at least one solution recovery opening for recovering dirty solution from a surface. In situations where the cleaning device is not adapted for cleaning or treating carpets, a squeegee may preferably be placed close to the recovery opening. The solution supply opening is connected to the clean solution tank, so that it is in solution communication with the clean solution tank. The solution recovery opening is connected to the dirty solution tank, so that it is in solution communication with the, dirty solution tank. The cleaning device further comprises means for supplying solution from said clean solution tank through said supply opening, preferably in the form of gravity or in the form of a pump. Further, the cleaning device comprises suction means for recovering solution through said recovery opening to said dirty solution tank.

The clean solution tank, the dirty solution tank and the cleaner head may have any shape and size. The clean solution tank is preferably not smaller than the dirty solution tank. It is particularly preferred that the clean solution tank and the dirty solution tank have similar size. In some situations, which, however, are not preferred, the dirty solution tank maybe constituted by the pipeline that transfers the used solution from the cleaner head to the filter unit. The cleaner head is designed to the type of surface that the cleaning device should clean and/or treat. The cleaner head may preferably be replaceable. A preferred cleaner head may comprise any type of scrubbing means e.g. a rotary brush or brushes in connection with the supply opening. The cleaner head further may comprise a squeegee placed close to the recovery opening. The preferred size and shape of the cleaner head depends on the type of surface it is adapted to clean. In some devices according to the invention, the cleaner head is divided into two sections, a first section for supplying fresh solution, and a second section for recovering dirty solution. These two sections may be physically separated from each other.

For most types of cleaning devices, it is preferred that the means for supplying solution from the clean solution tank through the supply opening is gravity. However for some types of cleaning devices, such as carpet cleaners, the means for supplying solution from the clean solution tank through the supply opening may preferably be a pumping means.

The cleaning device may be movable provided by any size and style moving means and may preferably comprise wheels. The movable cleaner head may be movable with respect to the solution tank or in that the whole cleaning device is movable.

It is preferred that the cleaning device is a floor scrubber or a carpet cleaner, and except for the filter unit, it may preferably be similar to the cleaners described in the ADVANCE™ brochure "ADVANCE™, Commercial and Industrial Cleaning Equipment" 1994 Form No. 28493 8/94 and "ADVANCE™, Commercial Cleaning Equipment" 1996 Form No. L0377A, 4/96.

The central part of the invention is the use of a filter unit which filter unit comprises at least one cross flow-filter. Such a filter unit is able to separate solution from particles to obtain a clear cleaned solution, without clogging of the filter or filters in the filter unit.

The filter unit preferably comprises a membrane filter, and more preferably, a cross-flow membrane filter. Such membrane filters are known from the art of separating proteins, micro-organism and the like from fluids. Membrane filters are also known from the technology of separating oil emulsions used in water-based cooling agents. In these systems, the oil emulsions are retained by the membranes, and water and solutes pass the membrane filter.

A membrane filter is in this application defined as a filter with a microporous structure, which cross-flow filter restricts the passage of different components in a very specific manner, without creating a filter cake.

It is preferred that the filter unit comprises a solid membrane filter. The membrane may have any thickness e.g. from 1 mm to 1 cm. The membrane may preferably have pore size between 10–10,000 kD or between 0.001–5 μm. The membrane filter can be made from any suitably suitable material such as ceramics, graphite, metals metaloxides, papers and polymers. In the present invention, it is particularly preferred that the membrane filter comprises a membrane made of one or more materials selected from polymeric materials, ceramic materials, and metals.

The structure of the membrane may be symmetric (meaning that the pore diameters do not vary over the membrane cross section) or it may be asymmetric so that the pore diameters increase from one side of the membrane to the other by a factor of up to about 100.

Suitable membrane filters are described in DE patent publication 26 53 875, U.S. Pat. No. 4,91 5837, U.S. Pat. No. 4,726,900, U.S. Pat. No. 4,990,256 and U.S. Pat. No. 5,681,469, which are hereby incorporated by reference.

The membrane filter of the filter unit is preferably packed in a flat, spiral wound, tubular fibre type configuration. Most preferred are tubular fibre type configurations, such as "spaghetti" or hollow tubular fibre type configurations.

In a cross-flow filter, no filter cake formation or "in-depth" filtration takes place. The filter surface should be sufficiently open to allow for water to pass it. It is predefined that the filter source is sufficiently open to allow for unused detergent to pass it. At the same time, it is preferred tat the filter surface should not be more open than this so that it is able to retain essentially all of the particles that cause turbidity in the recycled solution. Thereby, visual deterioration of the cleaning result (floor appearance etc.) may be avoided.

In a particularly preferred embodiment of the cleaning device of the invention, particularly a floor scrubber or a carpet cleaner, the filter unit farther comprises a coarse screen unit for precleaning the dirty solution before it enters the membrane filter. This coarse screen unit may comprises one or more screens preferably having a mesh width in the range 50–2,000 μm. In most situations, it is sufficient if the coarse screen unit comprises one or two screens.

If the cleaning device should be used in cleaning very dirty surfaces, particularly dirty floors such as floors in automobile shops, it is preferred that the coarse screen unit comprises multiple screens, e.g. up to 5 coarse screens with decreasing mesh width, arranged in a sandwich structure.

In a preferred embodiment of the invention, the cleaning device further comprises a pumping means for pumping clean solution from the clean solution tank in a back-flush through the filter unit, whereby the filter unit is regenerated.

When the pumping means for pumping clean solution from the clean solution tank in back-flush through the filter unit is in operation, the pumping means for pumping dirty solution through the filter unit may continue operating.

It is preferred that the pumping means for pumping clean solution from the clean solution tank in a back-flush through the filter unit is controlled by an automatic control unit for starting and stopping said pumping means. More preferably, all of the pumps and the valves of the cleaning device are controlled by an automatic control unit.

Furthermore, it is preferred that the cleaning device is constructed in a way whereby the filter unit, the pumps and the valves of the device are easy to access.

The present invention also comprises a cleaning device in combination with a filtering station. In this aspect of the invention, the cleaning device is separated from the filter unit, but is adapted to be connected to the filter unit for regeneration of dirty solution, preferably by use of a snap lock device or a quick connection. Such snap lock devices and quick connections are generally known.

The preferred filter units and constructions of cleaning devices are as described above.

The invention further comprises a process of recycling solution containing detergent and water in a cleaning device or a cleaning device in combination with a filter station.

In the process according to the invention, clean solution is transported from the clean solution tank to the cleaner head and through the supply opening of the cleaner head onto the surface to be cleaned e.g. a floor or a carpet. The amount of solution transported through the supply opening may preferably be from 0.1 to 20 l/min. Used solution is recovered through the recovery opening of the cleaner by use of a suction means, such as a pump or a suction device, and the recovered dirty solution is transported to the dirty solution tank. It is preferred that at least 60% by volume of the solution is recovered in some preferred embodiments of the invention up to about 100% of the solution can be recovered. In order to recover as much dirty solution as possible, the solution on the surface to be cleaned may be collected by use of a squeegee mounted on the cleaner head. Such arrangements are generally known from the art.

Dirty solution is transported from the dirty solution tank through a filter unit comprising a cross-flow filter. From this filter unit, concentrated dirty solution is returned to the dirty solution tank, and filtered cleaned solution is transported to the clean solution tank for reuse. The pressure on the dirty solution side of the filter unit may be 0.5–10 bar. A typical flow rate through the cross-flow filter is 0.1–4.0 l/min/m$^2$.

With regular intervals, preferably from 1 to 20 times per minute, more preferably from 1 to 10 times per minute, the filter unit is preferably regenerated by pumping clean solution from the clean solution tank in a back-flush through the filter unit.

Each step of pumping clean solution from the clean solution tank in a back-flush through the filter unit may have a duration of from 0.5 to 10 seconds. An automatic control unit may preferably regulate the intervals and duration of the back-flush procedure.

The cleaned solution may preferably be recirculated to the clean solution tank at a flow of about 0.1 to 1,000 l/hr. The optimal speed of recirculation depends largely on the solution consumption of the cleaning device under operation. Preferably, the of recirculation of the clean solution should correspond to the speed of consumption.

The concentration of detergent and/or treatment chemicals in the solution depends on the type of detergent/treatment chemicals, the type of surface that is to be cleaned/treated, and the type of dirt to be removed from this surface. In most situations, however, a detergent solution having a detergent concentration in the range 0.001–25% by weight is suitable for cleaning surfaces.

DESCRIPTION OF THE DRAWINGS

The invention is described in further detail with reference to the following figures and examples.

DESCRIPTION OF THE PREFERRED EMBODIMENTS

Sedimentation of Dirt

Figure 1:
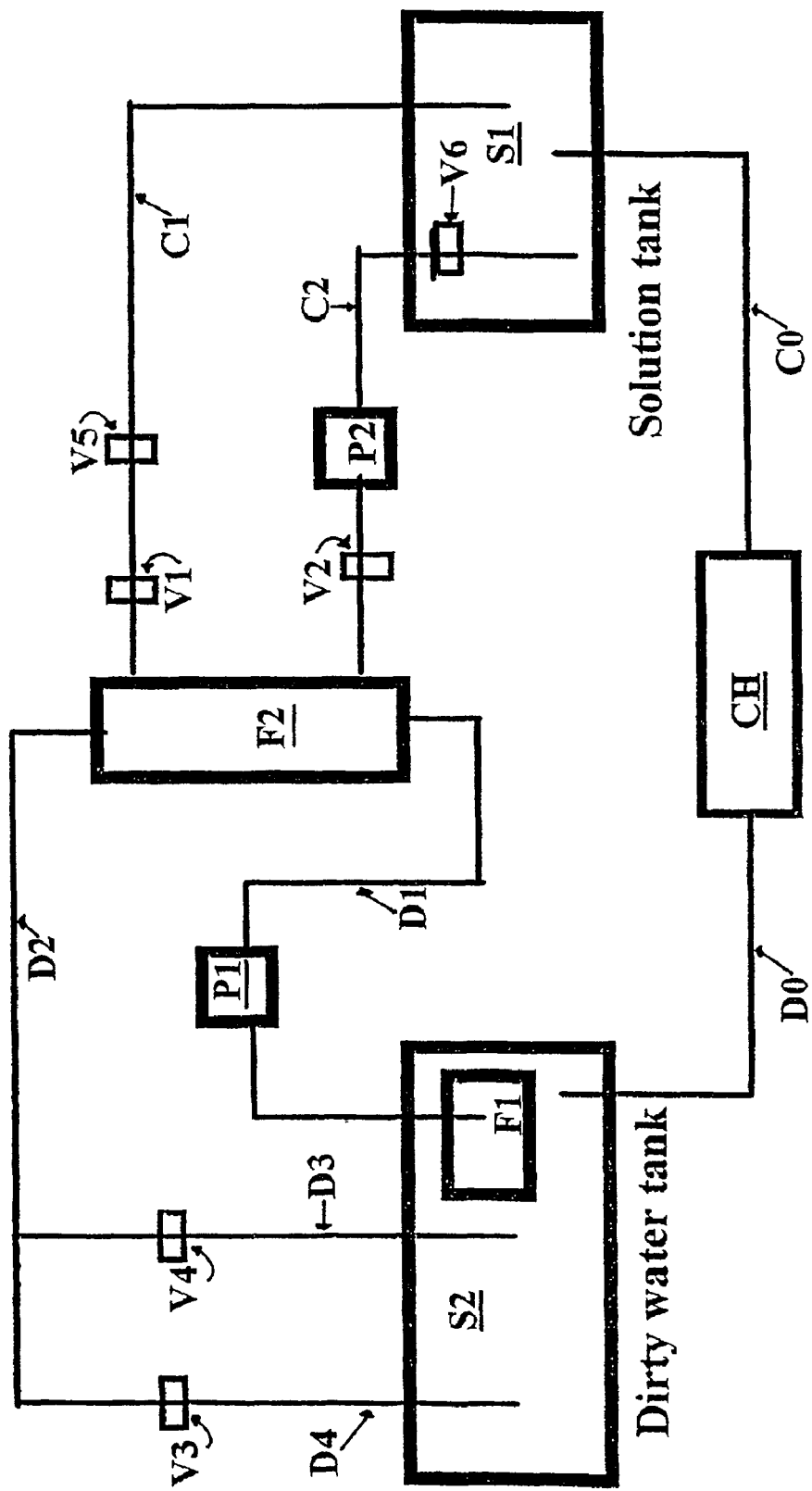
FIG. 1 is a diagram of a recycling system in a cleaning device according to the invention.

Debris or "Dirt", collected by a floor scrubber using conventional cleaning solutions, has been analyzed from a number of different locations. It was found that up to 83% (% w/w) of the dirt particles consists of particles <20 $\mu$m. A summary of the findings from 4 different locations is shown in table 1:

TABLE 1

Weight fraction of "dirt particles" smaller that 20 $\mu$m in a dirty solution obtained from different locations.

| Location | | Particles < 20 $\mu$m |
|---|---|---|
| High Voltage Lab. | Heavy industry floor | approx. 26.5% |
| Engineering Production | Light industry painted floor | approx. 30.0% |
| Volvo (Ballerup) | Auto repair shop (tile floor) | approx. 83.0% |
| Kvickly | Supermarket hard floor | approx. 63.4% |

The corresponding "dirt loads" (grams per liter) that were collected from the same respective locations are shown in table 2.

TABLE 2

Dirt load in collected "dirty solution" in a floor scrubber in a solution obtained from different locations.

| Location | | Total Dirt Load (g/l) |
|---|---|---|
| High Voltage Lab. | Heavy industry floor | approx. 36.23 g/l |
| Engineering Production | Light Industry painted floor | approx. 4.40 g/l |
| Volvo (Ballerup) | Auto repair shop (tile floor) | approx. 19.10 g/l |
| Kvickly | Supermarket hard floor | approx. 3.31 g/l |

From Table 1, it was concluded that a significant part of "dirt" consists of particles smaller that 20 $\mu$m. From table 2, it can be seen that it is quite normal that dirt collected from floors comprises relatively large amounts (e.g. 10–20 g/l) of particles smaller that 20 $\mu$m. Trying to clean such a dirty solution using ordinary in-depth filters alone will lead to very frequent replacement, and filters having very large filter areas would be necessary, assuming that the cleaning devices typically have a 0.5–10 l/min solution consumption.

Hereafter, it was investigated how the "dirty solutions" behaved in a sedimentation test in a standard conical beaker. The starting solution (in the clean solution tank) in all tests was a clear solution. The resets are shown in table 3:

TABLE 3

Sedimentation test in a conical beaker (1000 ml) [[incl.]] including centrifugation test.

| Location | | Sedimentation characteristics |
|---|---|---|
| High Voltage Lab. | Heavy industry floor | 72 hours: No clear phase |
| High Voltage Lab. | Heavy industry floor | 3.000 rpm/10 min: No clear phase. |
| High Voltage Lab. | Heavy industry floor | 4.000 rpm/5 min: [[no]] No clear phase |
| Engineering Production | Light industry painted floor | 72 hours: No clear phase |
| Volvo (Ballerup) | Auto repair shop (tile floor) | 72 hours: No clear phase |
| Kvickly | Supermarket hard floor | 120 hours: No clear phase |

It was not possible to obtain a clear solution by sedimentation in any case. "No clear phase" means that the upper fraction of the solution still contains much turbidity by visual inspection.

Hereafter, it was tested if centrifugation could clean the liquid. The "dirty solution" from the "Heavy industry floor" was centrifuged using 3.000 rpm (10 min) and 4.000 rpm (5 min). Still, it was not possible to obtain a clear phase in the centrifuged liquid in either case.

A Preferred Cleaning System of the Invention

Figure 2:
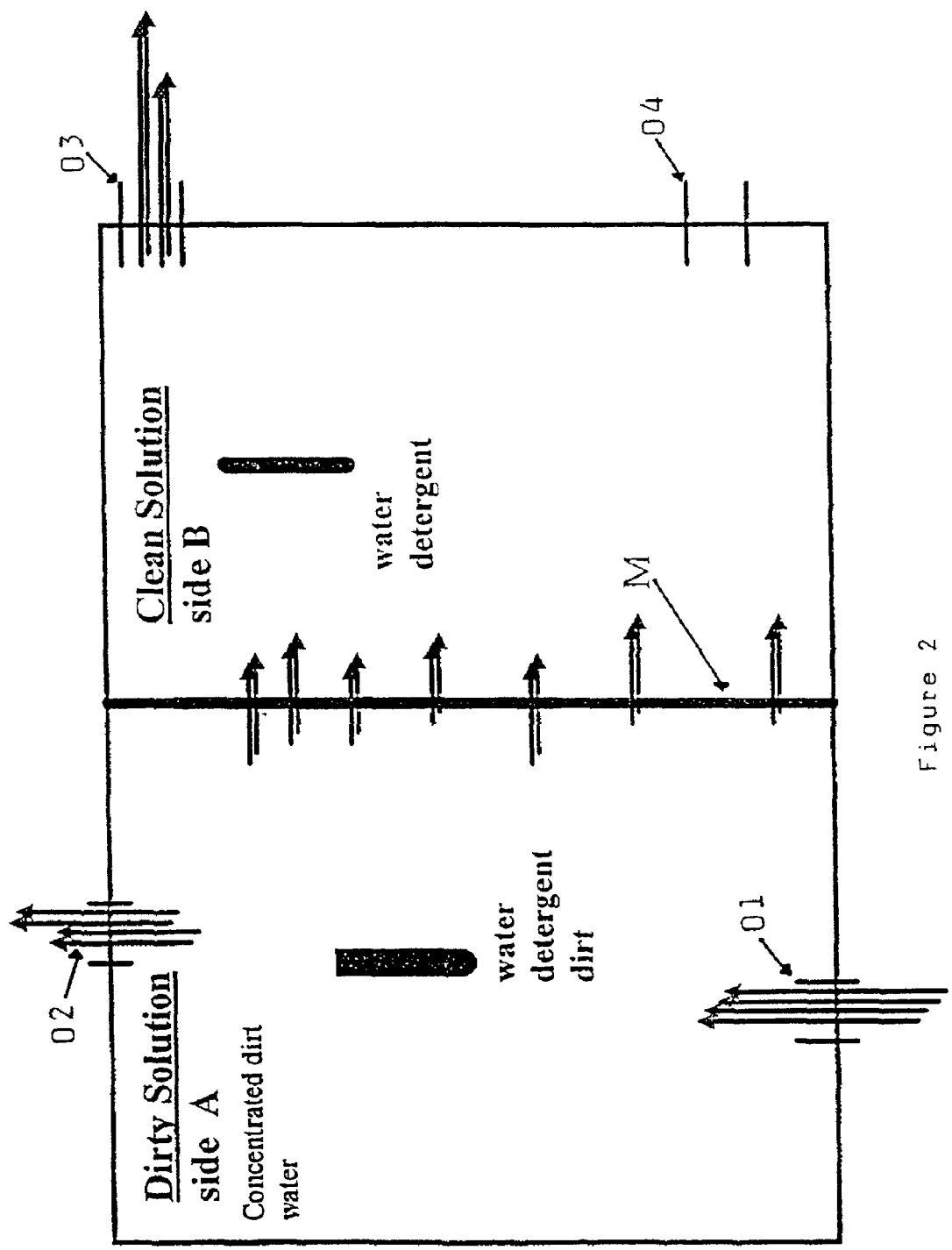
FIG. 2 is a diagram of the cross-flow membrane filter of the recycling system shown in FIG. 1.

FIGS. 1 and 2 show schematically a preferred cleaning device, and in particular, the recycling system thereof.

FIG. 1 shows a preferred recycling system of a cleaning device according to the invention. The recycling system comprises a clean solution tank S1 and a dirty solution tank S2. A cleaner head CH is placed between the clean solution tank S1 and the dirty solution tank S2. The recycling system comprises a coarse screen F1, a membrane filter unit F2, valves V1, V2, V3, V4, V5 and V6, pumps P1 and P2, and pipelines C0, D0, D1, D2, D3, D4, C1, and C2.

The recycling system can work in two modes, a first mode where the dirty solution is cleaned and recirculated, and a second mode where the filter unit is regenerated.

When starting using the cleaning device, the solution tank S1 is filled with fresh solution. The solution flows through pipeline C0 from the solution tank S1, and down to a cleaner head CH from where it is applied on the floor or surface to be cleaned. The dirty solution mixture is picked up via the cleaner head, and transported trough pipeline D0 to the dirty solution tank S2. A coarse screen F1, having relative large mesh size (100–2,000 $\mu$m) is placed inside said dirty solution tank.

When the recycling system works in its first mode, dirty solution is sucked through the course screen F1 using the pump P1, and a solution stream flows through pipeline D1. Tie course screen F1 stops large particles from entering the membrane filter unit F2 and valves V3 and V4, and the filter unit and the valves are consequently prevented from clogging. After passing through pipeline D1, the solution flows through membrane filter unit F2. The membrane filter unit comprises a cross-flow membrane as it is shown in FIG. 2. The solution flows into the filter unit F2 through opening 01 on the dirty side A, where it passes along the membrane M. Some water and detergent pass through the membrane M and enter the clean solution side B, and exit the filter unit F2 through opening 03 into pipeline C1. The concentrated dirt and solution mixture leaves the filter unit F2 through opening D2 into pipeline D2. When the recycling system works in its first mode, valve V3 is closed while the passing rough valve V4 is adjusted so as to obtain a suitable pressure difference over the membrane M e.g. 0.5 to 10 bar. The dirty solution concentrate returns to the dirty solution tank through pipeline D3. Valve V1 is open, and the solution from pipeline C1 flows freely through valve V1 and the check valve V5, which stops air from entering the filter unit F2. The solution from pipeline C1 flows into the clean solution tank. Valve V2 is closed and pump P2 is turned off when the system is working in its first mode. The size of solution stream in pipeline C1 compared to the size of solution stream in pipeline D2 is determined by the back-pressure created by valve V4 and the resistances of the membrane, so that any settlement of dirt an the membrane is avoided The back-pressure is chosen according to the tolerance of the membrane M and the establishment of a cross-flow trough pipeline D2 large enough to transport all dirt entering the filter through pipeline D1 back to the dirty solution tank S2.

For regular cleaning of the membrane M a back-flush mechanism is used. This back-flush mechanism is operating when the system is working in its second mode. When the back-flush mechanism is turned on, valve V3 is opened to reduce the membrane pressure valve V1 is closed, valve V2 is opened and pump P2 turned on. All of the solution stream passing through pipeline D1 then flows directly through filter unit F2 and into pipeline D2. From pipeline D2, the solution stream splits into pipelines D3 and D4, from where it flows into the dirty solution tank S2. The pump P2 is started, and a clean solution stream flows from the clean solution tank S1 into the pipeline C2, where it passes through check valve V6 and the open valve V2. The clean solution stream from pipeline C2 flows into the filter unit F2 through opening 04 on the clean side B of the membrane M, and it passes along the membrane M. The clean solution passes through membrane M and enters the dirty solution side A. When the clean solution passes though membrane M from the clean side B to the dirty side A, the membrane M is regenerated. After having passed the membrane M, the solution flows, along with the dirty solution from pipeline D1, out in pipeline D2.

The construction and design of the membrane filter unit F2 is not crucial for the recycling system to work; this is shown later on in example 5. The cross-flow operation of the filter is important and distinguishes this technology from used methods of in-depth filtration. Thus, it is particularly preferred that the membrane filter unit F2 uses a cross-flow principle as it is illustrated on FIG. 2, where water and detergent (and possibly treatment chemicals) cross the membrane M, while dirt just passes along the membrane M.

Figure 3:
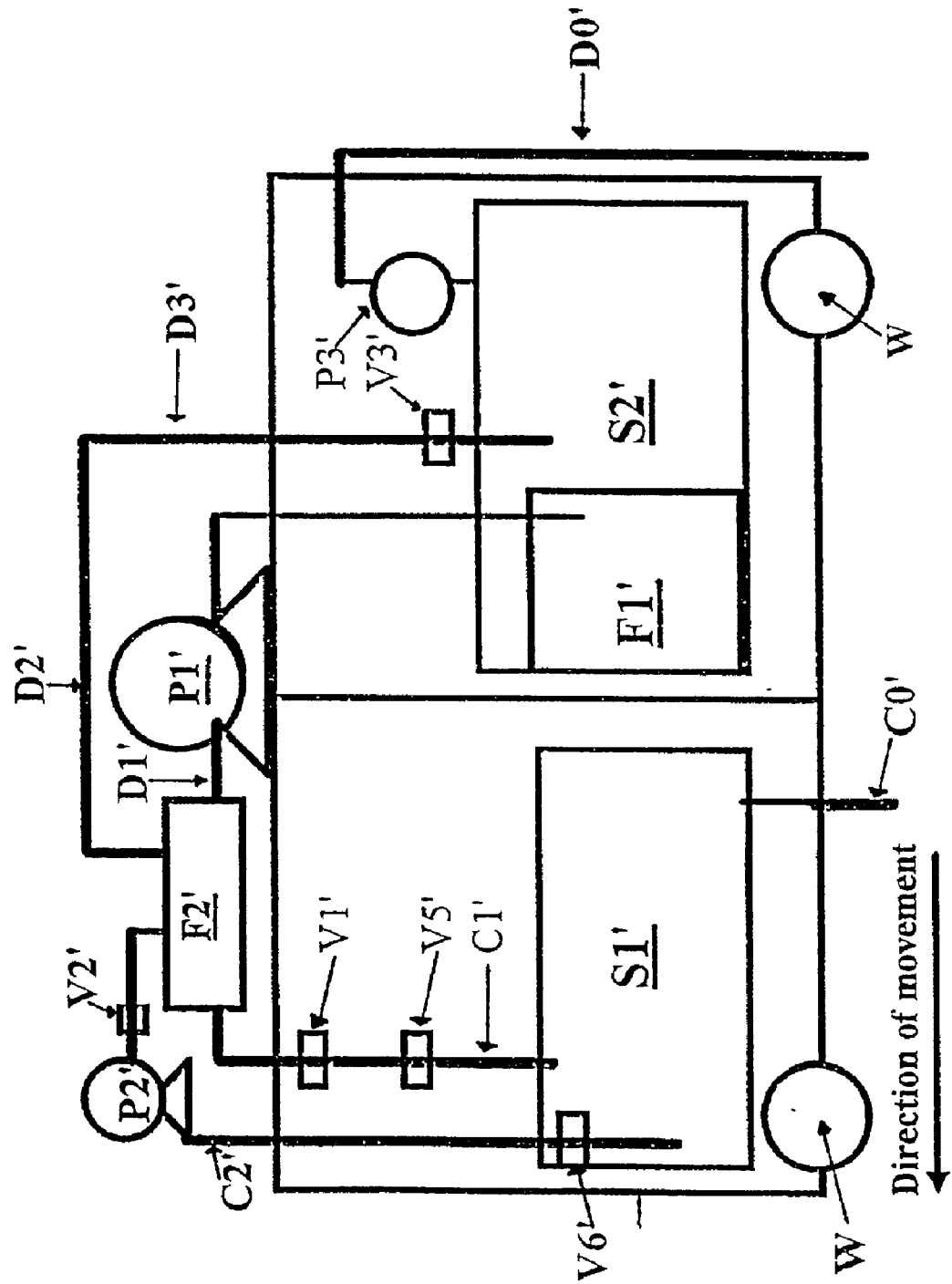
FIG. 3 is a diagram of another recycling system in a cleaning device according to the invention.

FIG. 3 shows another preferred recycling system of a cleaning device according to the invention The device is transported on wheels W, and is supposed to be moved in the direction shown by the arrow when in use. The recycling system comprises a clean solution tank S1' and a dirty solution tank S2'. The recycling system comprises a coarse screen F1', a membrane filter unit F2', valves V1', V2', V3', V5' and V6'; pumps P2' and P2'; pump/suction device P3'; and pipelines C0', D0', D1', D2', D3', C1', and C2'.

The recirculating system can work in two modes, as described above with the description of FIG. 1.

When starting using the cleaning device, the solution tank S1' is filled with fresh solution. The solution flows rough pipeline C0' from the solution tank S1', and down to a cleaner head, not shown. Dirty solution is recovered using pump/suction device P3', and transported through pipeline D0' to the dirty solution tank S2'. A coarse screen F1' is placed inside said dirty solution tank S2'.

When the recycling system works in its first mode, dirty solution is sucked through course screen F1' using the pump. P1', and a solution stream flows through pipeline D1'. After passing through pipeline D1', the solution flows through membrane filter unit F2'. The membrane filter unit comprises a cross-flow membrane M as it is shown in FIG. 2 and described above. The clean filtered solution exits the filter unit F2' through pipeline C1'. The concentrated dirt and solution mixture leaves the filter unit F2' through pipeline D2'. When the recycling system works in its first mode, the flow passing through valve V3' is adjusted so as to obtain a suitable pressure. The dirty solution concentrate returns to the dirty solution tank through pipeline D3'. Valve V1' is open, and the solution from pipeline C1' flows freely through valve V1' and the check valve V5', which stops air from entering the filter unit F2'. The solution from pipeline C1' flows into the clean solution tank S1'. Valve V2' is clog and pump P2' is turned off when the system is working in its first mode.

For regular cleaning of the membrane, a back-flush mechanism is used. This back-flush mechanism is operating when the system is working in its second mode. When the back-flush mechanism is turned on valve V3' is adjusted to reduce the membrane pressure, valve V1' is closed, valve V2' is opened and pump P2' is turned on. All of the solution stream passing through pipeline D1' then flows directly through membrane filter unit F2' and into pipeline D2'. From pipeline D2', it flows via pipeline D3' into the dirty solution tank S2'. The pump P2' is started, and a clean solution stream flows from the clean solution tank S1' into the pipeline C2', where it passes through check valve V6' and the open valve V2'. The clean solution stream from pipeline C2' flows into the filter unit F2' on the clean side B of the membrane M, and it passes along the membrane M. The clean solution passes through the membrane M and enters the dirty solution side A. When the clean solution passes through membrane M from the clean side to the dirty side, the membrane M is regenerated. After having passed the membrane M, the solution flows, along with the dirty solution from pipeline D1', out in pipeline D2'.

EXAMPLE 1

Before a separation test, the turbidity (NTU) of the tap water and the solution with different detergent concentrations was measured using a turbidity meter. The turbidity of the cleaning solution as a function of cleaning agent concentration is shown in table 4.

TABLE 4

| Turbidity in solution(s) with 0–1% of CAA (cleaning agent A). ||
| --- | --- |
| Solution | Turbidity in NTU |
| Pure tap water | 2.18 NTU |
| 0.05% CAA | 2.39 NTU |
| 0.10% CAA | 2.47 NTU |
| 0.25% CAA | 2.05 NTU |
| 0.50% CAA | 2.12 NTU |
| 1.00% CAA | 2.35 NTU |

A floor scrubber (Model BR 1000 manufactured by Nilfisk Advance A/S) was equipped with a sandwich type coarse screen and a tubular type cross flow membrane filter type CFP-1-D-9A manufactured by AIG Technology Inc.

The coarse screen had a 405/100 μm screen (wire mesh). The coarse screen was built as two large filter bags placed inside one another with spacers around, and suction from the inside of the inner filter bag. A solution of 0.5% cleaning agent A (CAA) was used in the test. A "dirty solution" was collected by a floor scrubber in a warehouse storage area and analyzed. The analyzed dirty solution was hereafter introduced in a membrane separator/filter. The experimental set-up used is shown in FIG. 1.

It was found that more than 97% (% w/w) of the dirt particles consists of particles <20 μm. A summary of the findings from this location is shown in table 5.

It can be seen that the quality (turbidity) of the filtered solution is as good as tap water or the 0.5% starting solution used. A particle free filtered solution that can be recycled directly is clearly obtained.

EXAMPLE 2

The same floor scrubber including a coarse screen and the same membrane as mentioned in example 1 was used. 40 liters of water were mixed with 200 ml "CAA".

Floor cleaning in the warehouse storage area (see table 5) was performed. 28 liters of dirty water solution were collected The dirty solution was diluted with water to about 55 liters volume.

The concentration of "CAA" in the dirty solution (A) was now about 0.25% by volume. The surface tension of the dirty solution was measured. Two samples of the dirty solution (A) was diluted with water to obtain, respectively a 25% by volume dilution with water and a 6% by volume dilution with water of the dirty solution (A). Now recycling of the dirty solution performed. The permeate was recycled back into the dirty solution tank. The surface tension of the filtered solution (A) was measured. Furthermore, two samples of the filtered solution were diluted with water to obtain, respectively, a 25% by volume dilution with water and a 6% by volume dilution with water of the filtered solution. The surface tension as a function of detergent concentration was thereby obtained. The surface tension of tap water was measured to be about 49 dyn/cm.

Now about 100 ml CAA was added to the dirty solution tank, and the experiment was repeated. The surface tension of the dirty solution (B), the filtered solution (B) and the 25% by volume and 6% by volume dilutions thereof was measured. The dirty solution (B) had a concentration of about 0.43% of CAA.

Finally, 50 ml CAA was added to the dirty solution tank and the experiment was repeated. The su tension of the dirty solution (C), the filtered solution (C) and the 25% by volume and 6% by volume dilutions thereof was measured. The dirty solution (B) had a concentration of about 0.52% of CAA.

TABLE 5

Weight fraction of "dirt particles" smaller that 20 μm in a dirty solution collected from a warehouse storage area.

| Location | | Particles < 20 μm |
|---|---|---|
| Warehouse storage | Light industry concrete floor | Approx. 97.4% w/w ("dirty solution") |

From table 4, it can be seen that in this case the solution (0–1% cleaning agent) had a turbidity similar to the turbidity of tap water. The turbidity of the "dirty solution" as well as the filtered solution that has been separated by the membrane type CFP-1-D-9A is shown in table 6.

TABLE 6

Turbidity of solutions in example 1.

| Solution | Turbidity in NTU |
|---|---|
| Pure tap water | 2.18 NTU |
| 0.50% CAA | 2.12 NTU |
| filtered solution A | 1.13 NTU |
| "dirty solution A" | ≈3.700 NTU |

It can be seen that the quality (turbidity) of the filtered solution, is as good as tap water or the 0.5% starting solution used. A particle free filtered solution that can be recycled directly, is clearly obtained.

EXAMPLE 2

The same floor scrubber incl. a coarse screen and the same membrane as mentioned in example 1 was used. 40 liters of water was mixed with 200 ml "CAA". Floor cleaning in the warehouse storage area (see table 5) was performed. 28 liters of dirty water solution was collected. The dirty solution was diluted with water to about 55 liters volume.

The concentration of "CAA" in the dirty solution (A) was now about 0.25% by vol. The surface tension of the dirty solution was measured. Two samples of the the dirty solution (A) was diluted with water to obtain, respective, a 25% by vol. dilution with water and a 6% by vol. dilution with water of the dirty solution (A). Now recycling of the dirty solution was performed. The permeate was recycled back into the dirty solution tank. The surface tension of the filtered solution (A) was measured. Further more two samples of the filtered solution was diluted with water to obtain, respective, a 25% by vol. dilution with water and a 6% by vol. dilution with water of the filtered solution. The surface tension as a function of detergent concentration was thereby obtained. The surface tension of tap water was measured to be about 49 dyn/cm.

Now about 100 ml CAA was added to the dirty solution tank, and the experiment was repeated. The surface tension of the dirty solution (B), the filtered solution (B) and the 25% by vol. and 6% by vol. dilutions thereof was measured. The dirty solution (B) had a concentration of about 0.43% of CAA.

Finally 50 ml CAA was added to the dirty solution tank. and the experiment was repeated. The surface tension of the dirty solution (C), the filtered solution (C) and the 25% by vol. and 6%, by vol. dilutions thereof was measured. The dirty solution (B) had a concentration of about 0.52% of CAA.

The results are shown in table 7.

TABLE 7

Surface tensions of solutions in example 2.

| Solution | Surface tension "100% by vol." | Surface tension "25% by vol." | Surface tension "6% by vol." |
|---|---|---|---|
| Pure tap water | 49 dyn/cm | 49 dyn/cm | 49 dyn/cm |

TABLE 7-continued

Surface tensions of solutions in example 2.

| Solution | Surface tension "100% by vol." | Surface tension "25% by vol." | Surface tension "6% by vol." |
|---|---|---|---|
| Dirty solution A | 33 dyn/cm | 34 dyn/cm | 39 dyn/cm |
| Dirty solution B | 30 dyn/cm | 32 dyn/cm | 39 dyn/cm |
| Dirty solution C | 31 dyn/cm | 32 dyn/cm | 39 dyn/cm |
| Filtered solution A | 33 dyn/cm | 38 dyn/cm | 43 dyn/cm |
| Filtered solution B | 33 dyn/cm | 36 dyn/cm | 42 dyn/cm |
| Filtered solution C | 32 dyn/cm | 33 dyn/cm | 39 dyn/cm |

From this table, it can be seen that the cleaning agent passes the membrane, and that only a certain amount of the cleaning agent is bound to the dirt. In this case less than 5% of the cleaning agent is used by the dirty and thus more than 95% can be recovered, filtered and recycled. Surprising in this case is that the recycling is limited only by the collection efficiency of solution from the floor.

EXAMPLE 3

In this example the surface tension of different detergent/dirt/water solutions using different membranes has been investigated. The tests were performed by circulating artificial dirty solution through a stationary filtration system similar to the system on the cleaning device shown in FIG. 1, wherein the cleaner head part was not present The surface tension was measured in the clean solution before the dirt was added, b) after the dirt was added, and c) in the two tanks when the filtration was terminated (the filtered solution is returned to the clean solution tank and the concentrate is returned to the dirty solution tank). The results are shown in table 8:

Some detergent remains in the concentrate stream. This detergent is mainly bound to the dirt and helps the dirt to be transported out of the membrane filter unit.

EXAMPLE 4

In this example, about 500 ml "CAA (CAA)" is mixed in about 105 liter tap water (TW). The solution (S1) is approximately a 0.5% "CAA" solution. Solution "S1" is filled into the clean solution tank of a floor scrubber according to the invention The floor scrubber used was a BR 1000 as used in example 1 which was equipped with a recycling system as it is schematically shown in FIG. 1. The cross-flow separator used was a separator type CFP-1-D-9A.

The characteristics of the solution were measured using both turbidity (NTU) and the surface tension (in dyn/cm) of the solution. Cleaning of a warehouse floor was performed for about 35 minutes. A permeate flow of about 150 l/hr was obtained. Automatic back-flush of 2 sec/min was used. About 65 liters of filtered solution (FS1) were produced and about 40 liters remained in the dirty solution tank. The recycling system including the back-flush system is shown in FIG. 1.

Data for the recovered solution and the concentrated dirty solution (DS) are shown in table 9.

TABLE 9

Turbidity and surface tension of solutions in example 4.

| Solution | Turbidity in NTU | Surface Tension |
|---|---|---|
| Tap water = TW | 0.13 NTU | 65 dyn/cm |
| 0.50% solution = S1 | 6.24 NTU | 30 dyn/cm |
| Filtered solution = FS1 | 1.98 NTU | 34 dyn/cm |
| Dirty solution = DS | ≈775 NTU | NA |

TABLE 8

Surface-tension of the different detergent/dirt/water solutions (OFW = obtained from cleaning warehouse floors).

| Dirt Type | Detergent Name | Concentration w/w % | Membrane Type | Pore size | IFT dyn/cm Solution | IFT dyn/cm Dirty solution | IFT dyn/cm filtered sol. | IFT dyn/cm Concentrate |
|---|---|---|---|---|---|---|---|---|
| Artificial | Daren 616 | 0.42 | Spiral | 300-kD | 32 | | 32.5 | |
| OFW | | | Spiral | 300-kD | | 34 | 36.5 | 34 |
| Artificial | Ajax Ultra | 0.29 | Spiral | 300-kD | 30 | 30 | 32 | |
| Artificial | Dispex N40 | 0.0022 | Spiral | 300 kD | 41 | 53 | 42 | |
| Artificial | Combifix | 1.1 | Spiral | 300 kD | 31 | 30 | 32 | |
| Artificial | Triton x100 | 0.05 | Spiral | 300 kD | 35 | 34 | 34 | |
| Artificial | Ajax Ultra | 0.30 | Hollow fiber | 500 kD | 26 | 27 | 32 | 28 |
| Artificial | Ajax Ultra | 0.28 | Hollow fiber | 500 kD | 26 | 26 | 27 | |
| OFW | | | Hollow fiber | 500 kD | | 34 | 41 | 37 |
| Artificial | Lutensol TO8 | 0.012 | Spiral | 300 kD | 27 | 28 | 30 | 29 |
| OFW | Universalrens | 0.5 | Hollow fiber | 0.1 μm | | 37 | 41 | |
| OFW | Universalrens | 0.5 | Hollow fiber | 0.1 μm | 27 | 34 | 34 | |

From table 8, it can be seen that the low surface tension of the starting solution (see column marked "Solution") is maintained in the clean recovered solution (see column "filtered sol."). This is valid for a range of different commercial detergents. Also, different cross flow membrane configurations can be used.

Now, the 65 liters of the above filtered solution FS1 were mixed with about 20 liters of water (T) including about 75 ml CAA into the clean solution tank. The volume in the clean solution tank was now about 85 liters and the surface tension of the solution (S2) was met to about 30 dyn/cm. Cleaning was performed for about 32 minutes and about 80 liters of recovered and filtered solution (FS2) were collected.

Automatic back-flush (2 sec/30 sec) was used. The surface tension of filtered solution FS2 was measured to about 32 dyn/km.

Hereafter, the 80 liters of the above recovered solution RS2 were mixed with about 20 liters of water (TW) including about 1.80 ml CAA into the clan solution tank. The volume in the clean solution tank was now about 100 liters and the surface tension of the solution (S3) was measured to about 30 dyn/cm. Cleaning was performed for about 31 minutes and about 85 liters of filtered solution FS3 were collected A permeate flow of about 135 l/hr was obtained. Automatic back-flush (2 sec/30 sec) was used.

Data for the all recovered solutions are shown in table 10.

TABLE 10

Turbidity and surface tension of solutions in example 4.

| Solution | Turbidity in NTU | Surface Tension |
|---|---|---|
| Filtered solution = FS1 | 1.98 NTU | 34 dyn/cm |
| Filtered solution = FS2 | 4.39 NTU | 32 dyn/cm |
| Filtered solution = FS3 | 7.43 NTU | 31 dyn/cm |

Figure 4:
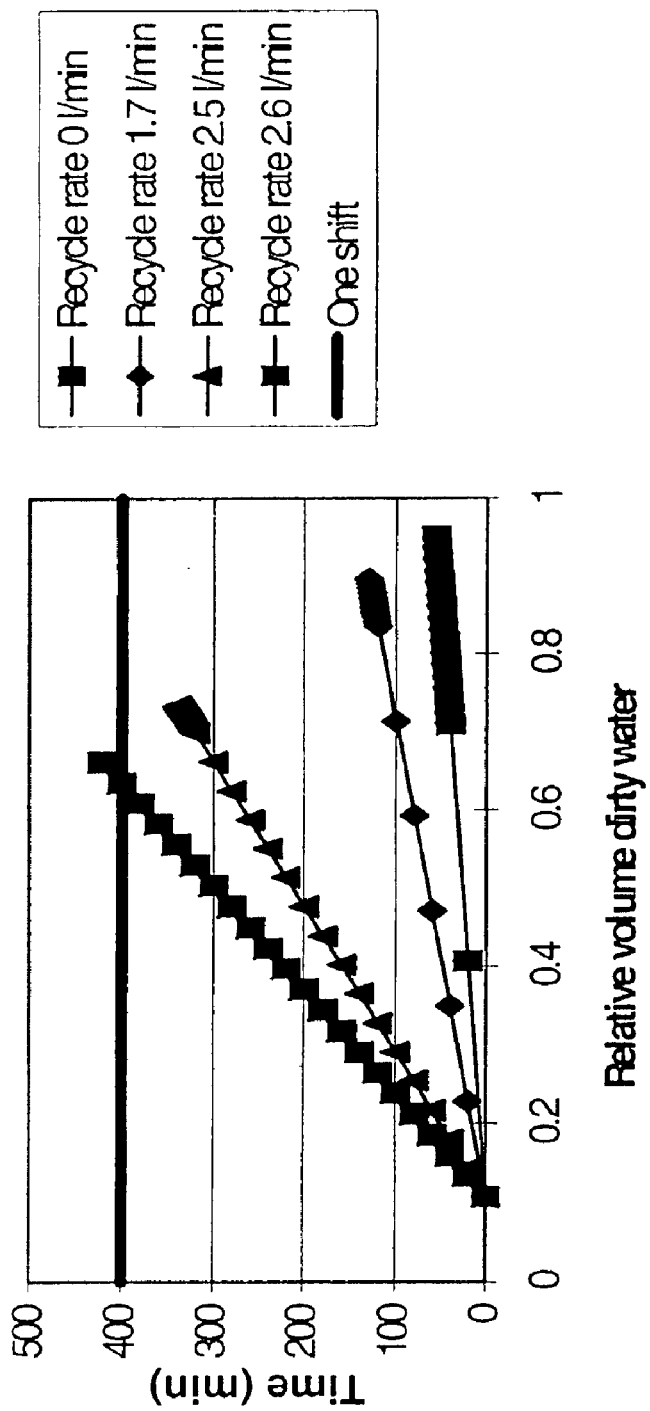
FIG. 4 is a diagram depicting effective time as a function of recycle rate at 3 liters/min solution, and 95% recovery from the floor.

From example 4, it was found that the cleaning solution could be recovered and filtered multiple times. The quality of the filtered cleaning solution FS3 after being recycled 3 times was equal to the original solution S1. The chemical consumption for performing the cleaning was reduce by up to about 85% in this example. The solution consumption was also reduced about 85%. It is quite clear that the effective time that the floor scrubber can be used for cleaning is substantially increased. This is shown in FIG. 4. The amount of effluent discharged from the floor cleaning operation is also reduced.

EXAMPLE 5

When cleaning a floor, the appearance of the floor after scrubbing is very important. The solution film left on the floor will dry out, and any dry matter might form a stain. In this example 5, the filtered solution was compared to pure solution and dirty solution by gloss measurements.

A floor scrubber as used in example 1 was filled with a 0.5% solution of detergent CAA. A membrane type CFP-1-D-9A was used as a separator. Samples were taken out of the stream from the separator to the clean solution tank after 0, 18 and 30 minutes after the scrubbing and recycling process was started, and further samples were taken from demineralized water without detergent, and dirty solution.

On a clean surface, an average gloss on five separate areas was measured. Then, a 50 $\mu$m layer of the test samples of the solutions was tape-casted out on the areas. The surface was left to dry, and an average gloss was measured again afterwards.

Figure 5:
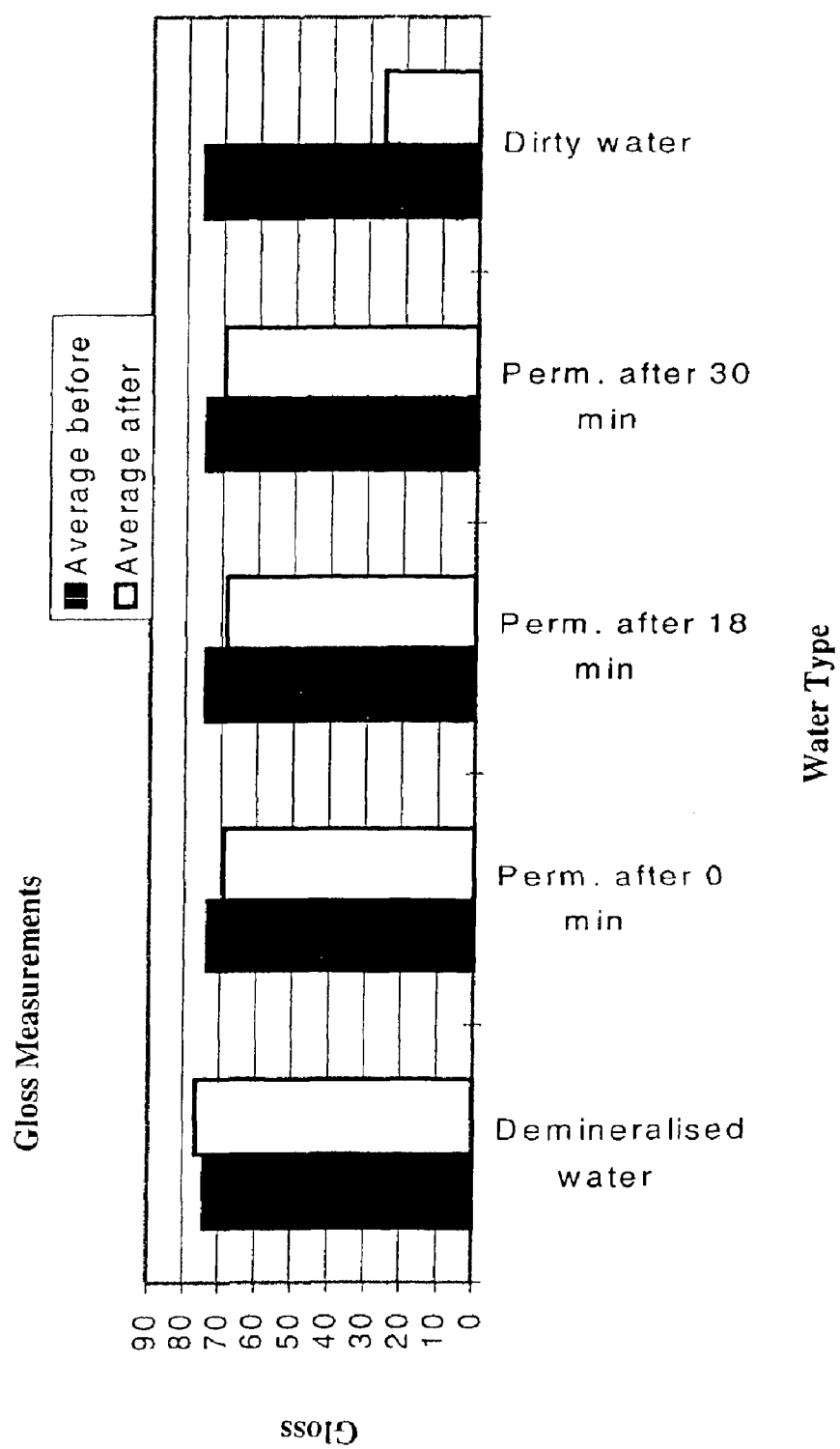
FIG. 5 is a diagram depicting gloss of surface between before and after drying out solution on the surface.

In the diagram of FIG. 5, the gloss of the surface areas before and after is shown. It is seen that the dirty solution gives a high reduction in gloss (<30) while the filtered solution keeps the gloss (70–75). The solution quality of the filtered solution as a function of time can also be seen to be stable.

What is claimed is:

1. A cleaning and/or treatment device comprising a clean solution tank, a dirty solution tank, and a movable cleaner head, said cleaner head comprises at least one solution supply operating for supplying clean solution to a surface, said solution supply opening being in solution communication with said clean solution tank, and at least one solution recovery opening recovering dirty solution from a surface, said solution recovery opening being in solution communication with said dirty solution tank, said cleaning device comprising means for supplying solution from said clean solution tank through said supply opening and suction means for recovering solution through said recovery opening to said dirty solution tank, said cleaning device filter comprising a filter unit for cleaning dirt from said dirty solution and means for recirculating said cleaned solution to said clean solution tank, wherein said filter unit comprises at least one cross-flow filter, said cross-flow filter preferably being a membrane filter.

2. A device according to claim 1, wherein the device is adapted to supply solution from said clean solution tank through said supply opening by gravity or by a pump.

3. A device according to claim 1, wherein said membrane filter comprises a membrane packed in a flat, spiral wound or tubular configuration.

4. A device according to claim 1, wherein said membrane filter comprises a membrane having a pore size between 10–10,000 kD.

5. A device according to claim 1, wherein said membrane filter comprises a membrane having a pore size between 0.001–5 $\mu$m.

6. A device according to claim 1, wherein said membrane filter comprises a membrane made of one or more materials selected from polymeric materials, ceramic materials, and metals.

7. A device according to claim 1, wherein said filter unit further comprises a coarse screen unit for precleaning the dirty solution before the dirty solution enters the membrane filter.

8. A device according to claim 7, wherein said coarse screen unit comprises one or more screens having a mesh width in the range 50–2,000 4 $\mu$m.

9. A device according to claim 7, wherein said coarse screen unit comprises multiple screens arranged in a sandwich structure.

10. A device according to claim 1, further comprising a pumping means for pumping clean solution from the clean solution tank in backflow through the filter unit.

11. A device according to claim 10, further comprising a control unit for starting and stopping said pumping means for pumping clean solution from the clean solution tank in backflow through the filter unit.

12. A device in combination with a filtering station according to claim 1, further comprising a pumping means for pumping clean solution from the clean solution tank in backflow through the filter unit.

13. A device in combination with a filtering station according to claim 12, further comprising a control unit for starting and stopping said pumping means for pumping clean solution from the clean solution tank in backflow through the filter unit.

14. A cleaning and/or treatment device in combination with a filtering station, said cleaning device comprising a clean solution tank, a dirty solution tank, and a movable cleaner head, which cleaner head comprises at least one solution supply opening for supplying clean solution to a surface, said solution supply opening being in solution communication with said clean solution tank, and at least one solution recovery opening for recovering dirty solution from a surface, said solution recovery opening being in solution communication with said dirty solution tank, said cleaning device comprising means for supplying solution from said clean solution tank through said supply opening and suction means for recovering solution through said recovery opening to said dirty solution tank, said cleaning device further comprising a first connection pipe adapted to be connected to an inlet pipe on the filtering station for providing a solution communication from said dirty solution tank to said filtering station, and a second connection pipe adapted to be connected to an outlet pipe on the filtering station for providing a solution communication from said filtering station to said clean solution tank, said filtering station comprising a filter unit for cleaning dirt from said dirty solution and means for recirculating said cleaned solution to said clean solution tank, wherein said filter unit comprises at least one cross-flow filter, said cross-flow filter preferably being a membrane filter.

15. A device in combination with a filtering station according to claim 14, wherein the device is adapted to supply solution from said clean solution tank through said supply opening by gravity or by a pump.

16. A device in combination with a filtering station according to claim 14, wherein said membrane filter comprises a membrane packed in a flat, spiral wound or tubular configuration.

17. A device in combination with a filtering station according to claim 14, wherein said membrane filter comprises a membrane having a pore size between 10–10,000 kD.

18. A device in combination with a filtering station according to claim 14, wherein said membrane filter comprises a membrane having a pore size between 0.001–5 $\mu$m.

19. A device in combination with a filtering station according to claim 14, wherein said membrane filter comprises a membrane made of one or more materials selected from polymeric materials, ceramic materials, and metals.

20. A device in combination with a filtering station according to claim 14, wherein said filter unit further comprises a coarse screen unit for precleaning the dirty solution before the dirty solution enters the membrane filter.

21. A device in combination with a filtering station according to claim 20, wherein said coarse screen unit comprises one or more screens having a mesh width in the range 50–2,000 $\mu$m.

22. A device in combination with a filtering station according to claim 20, wherein said coarse screen unit comprises multiple screen arranged in a sandwich structure.

23. A process of recycling solution containing water and detergent and/or treatment chemicals in a cleaning and/or treatment device comprising a clean solution tank, a dirty solution tank, and a movable cleaner head, which cleaner head comprises at least one solution supply opening for supplying clean solution to a surface, said solution supply opening being in solution communication with said clean solution tank, and at least one solution recovery opening for recovering dirty solution from a surface, said solution recovery opening being in solution communication with said dirty solution tank, said cleaning and/or treatment device comprising suction means for recovering solution through said recovery opening to said dirty solution tank, said process comprising the steps of transporting the dirty solution from the dirty solution tank through a filter unit for cleaning dirt from said dirty solution and recirculating the cleaned solution to the clean solution tank, wherein said filter unit comprises at least one cross-flow filter, said cross-flow filter preferably being a membrane filter.

24. A process according to claim 23, solution from said clean solution tank is supplied through said supply opening by gravity or by a pump.

25. A process according to claim 23, wherein said membrane filter comprises a membrane packed in a flat, spiral wound or tubular configuration.

26. A process according to claim 23, wherein said membrane filter comprises a membrane having a pore size between 10–10,000 kD.

27. A process according to claim 23, wherein said membrane filter comprises a membrane having a pore size between 0.001–5 $\mu$m.

28. A process according to claim 23, wherein said membrane filter comprises a membrane made of one or more materials selected from polymeric materials, ceramic materials, and metals.

29. A process according to claim 23, wherein said filter unit further comprises a coarse screen unit for precleaning the dirty solution before the dirty solution enters the membrane filter.

30. A process according to claim 29, wherein said coarse screen unit comprises one or more screens having a mesh width in the range 50–2,000 $\mu$m.

31. A process according to claim 29, wherein said coarse screen unit comprises multiple screens arranged in a sandwich structure.

32. A process according to claim 23, further comprising at least one step of pumping clean solution from the clean solution tank in backflow through the filter unit for cleaning said filter unit.

33. A process according to claim 32, wherein the step of pumping clean solution from the clean solution tank in backflow through the filter unit is performed at regular intervals.

34. A process according to claim 32, wherein each step of pumping clean solution from the clean solution tank in backflow through the filter unit has a duration of from 0.5 to 10 seconds.

35. A process according to claim 32, wherein the backflush procedure of pumping clean solution from the clean solution tank in backflow through the filter unit takes 0.5–30 seconds.

36. A process according to claim 32, wherein the backflush procedure of pumping clean solution from the clean solution tank in backflow through the filter unit is controlled by an automatic control unit.

37. A process according to claim 23, wherein clean solution is recirculated to the clean solution tank at a flow of about 0.1 to 1,000 l/hr.

38. A process according to claim 23, wherein the solution is a detergent solution having a detergent concentration in the range 0.001–25% by weight.

* * * * *

UNITED STATES PATENT AND TRADEMARK OFFICE
CERTIFICATE OF CORRECTION

PATENT NO. : 6,857,162 B1
DATED : February 22, 2005
INVENTOR(S) : Erik Rasmussen It is certified that error appears in the above-identified patent and that said Letters Patent is hereby corrected as shown below:

Column 1,
Line 28, delete "machine"," and insert -- machine. --;
Line 59, after "dirty solution tank", insert -- . --;
Line 66, delete "2443" and insert -- 244 --;

Column 2,
Line 31, after "place", insert -- , --;
Line 44, after "From this", insert -- , --;
Line 64, after "size", insert -- , --;

Column 3,
Line 1, after "devices", insert -- , --;
Line 3, delete "mid" and insert -- and --;
Line 38, after "solution", insert -- , --;
Line 45, after "surfaces", insert -- , --;

Column 4,
Line 1, before "dirty" delete ",";
Line 38, delete "tank" and insert -- tanks --;
Line 58, delete "membrance" and insert -- membrane --;

Column 5,
Line 23, delete "predefined" and insert -- preferred --;
Line 24, delete "source" and insert -- surface --;
Line 25, delete "tat" and insert -- that --;

Column 6,
Line 36, delete "Each" and insert -- The duration of each --;
Line 45, after "Preferably, the", insert -- speed --;

UNITED STATES PATENT AND TRADEMARK OFFICE
CERTIFICATE OF CORRECTION

PATENT NO. : 6,857,162 B1
DATED : February 22, 2005
INVENTOR(S) : Erik Rasmussen It is certified that error appears in the above-identified patent and that said Letters Patent is hereby corrected as shown below:

Column 8,
Table 3, line 3, delete "[[incl.]]";
Table 3, line 14, delete "[[no]]";
Line 55, delete "Tie" and insert -- The --;

Column 9,
Line 1, delete "D2" and insert -- 02 --;
Line 2, delete "rough" and insert -- through --;
Line 15, after "avoided", insert -- . --;
Line 17, after "M", insert -- , --;
Line 17, delete "trough" and insert -- through --;
Line 20, after "M", insert -- , --.

Signed and Sealed this

Twenty-fifth Day of October, 2005

JON W. DUDAS
*Director of the United States Patent and Trademark Office*